Dec. 22, 1931.  G. H. BUYKEN ET AL  1,837,701
TUBE CLAMP
Filed May 6, 1930
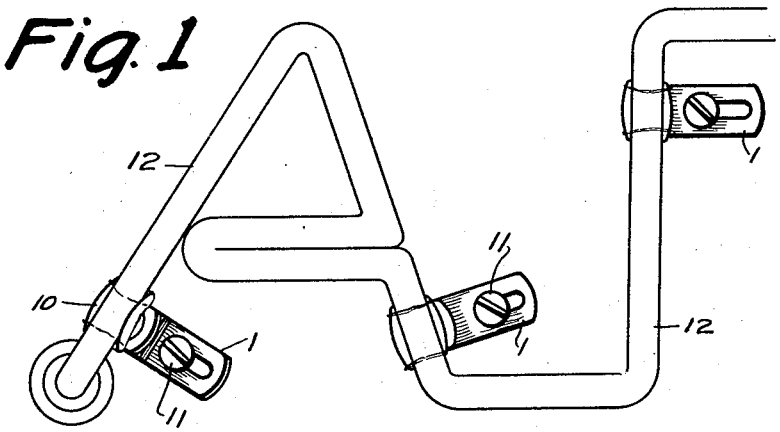
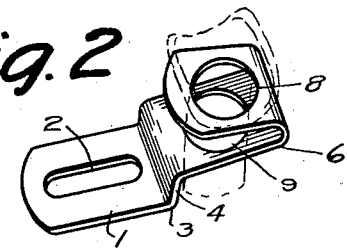
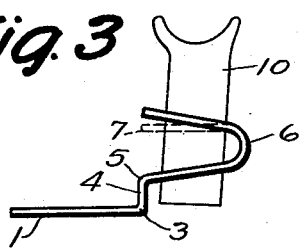
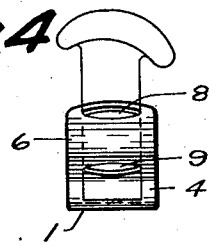
George H. Buyken
Frank E. Buyken
INVENTORS
BY *Harry Bowen*
ATTORNEY Patented Dec. 22, 1931

1,837,701

UNITED STATES PATENT OFFICE

GEORGE H. BUYKEN AND FRANK E. BUYKEN, OF SEATTLE, WASHINGTON

TUBE CLAMP

Application filed May 6, 1930. Serial No. 450,088.

The invention is a spring clip for holding tubes or round objects and is particularly adaptable for holding the tubular supports of neon signs.

The object of the invention is to provide a clip that will rigidly hold a tube and in which the tube may be readily placed.

Another object of the invention is to provide a tube clip in which a tube may be held without screws or the like.

A further object of the invention is to provide a spring clip for holding tubes in which the position of the tube in the clip may readily be adjusted.

A still further object of the invention is to provide a spring clip for holding tubes which may readily be installed.

And a still further object of the invention is to provide a spring clip for holding tubes which is of a simple and economical construction.

With these ends in view the invention embodies a spring clip having a flat base with an elongated opening therein, with a U-shaped portion having openings through both sides thereof, parallel to and raised slightly above the said base.

Other features and advantages of the invention will appear from the following description taken in connection with the drawings, wherein:—

Figure 1 is a view showing the device as it would appear in use.

Figure 2 is a perspective view of the clip.

Figure 3 is a side elevation of the clip.

Figure 4 is an end view of the clip.

Figure 5 is a plan view of the clip.

In the drawings the clip is shown as it would be made wherein numeral 1 indicates the base of the clip which is formed of a flat piece of material having an elongated opening 2 therein. The material of which the base is formed is bent upward at the point 3 forming a vertical portion 4, and then outward at the point 5, forming the U-shaped section 6, the sides of which are substantially parallel to the base. A circular opening is placed through both of the sides with the sides held in a parallel position, as indicated by the dotted lines 7 in Figure 3. And it will be observed that when the sides are released the edges of the openings 8 and 9, which extend through the sides, will grip and bind a circular object that may be placed through these openings in which the diameter of the circular object is substantially the same as that of the openings 8 and 9. In Figure 3 a tube 10 is shown held in the U-shaped portion 6 of the clip, and it will be noted that with the sides held together as indicated by the dotted lines 7, the tube may readily be inserted through the openings and when in the correct position the sides may be released so that they will bind against the surfaces of the tube and rigidly hold the tube, and it will be noted that by slightly holding the sides together the position of the tube may be adjusted by sliding the tube upward or downward and the tube may then be held by releasing the sides. The clip may be held to a base or any surface by a screw 11, as shown in Figure 1, which may be placed through the elongated opening 2 in the base 1.

It will be understood that changes may be made in the construction without departing from the spirit of the invention, one of which changes may be in the general design of the clip, another may be in the use of the clip for holding objects of any other shape, and still another may be in the use of other means for holding the clip.

The construction will be understood from the foregoing description. In use the clip may be attached to a base as shown in Figure 1, and the short tubes 10 may be placed in the clips, as hereinbefore described. The light tubes, as indicated by the numeral 12, may then be attached to the ends of the tubes 10 by wires or any other suitable means, and the position of the tubes 10 in the spring clips may be readily adjusted so that the light tubes will be even. It will therefore be observed that the light tubes may be readily held and adjusted without the use of screws or clips, or any other means for holding the short tubes by which they are held. At the same time this simple spring clip will hold the short tubes very rigid and with a positive grip so that there will be no danger whatever of their working loose or becoming detached. And at any time the tubes 10 may be freed by pressing the sides of the U-portion of the clip together, as there are no threads or small parts to rust or corrode to prevent the operation thereof.

Having thus fully described the invention, what we claim as new and desire to secure by Letters Patent, is:—

1. In a spring clip of the character described, a base, and a U-shaped portion substantially parallel with and slightly raised from the said base, said base having an elongated opening therein, and the sides of the said U-shaped portion having corresponding openings which are in alignment with the sides held parallel to each other.

2. In a tube clamp of the type having aligned openings the edges of which bind and grip upon the surface of an object passing therethrough as the openings separate, a U-shaped piece of material in the sides of which the said openings are formed, said piece of material having spring quality therein tending to force the said sides away from each other, a base attached to the end of one of the sides outwardly offset from the said side and parallel thereto, and means in the said base member by which it may be attached to an object.

3. In a tube clamp of the type having a flat piece of spring material formed in the shape of a U with openings in the sides and the sides having a tendency to spring outward, a supporting member extending from the end of one of the sides outwardly offset therefrom and parallel to the said side.

In testimony whereof they affix their signatures.

GEORGE H. BUYKEN.
FRANK E. BUYKEN.